United States Patent [19]

Kitagawa

[11] Patent Number: 6,082,220
[45] Date of Patent: Jul. 4, 2000

[54] POWER TRANSMISSION FOR AN ENGINE

[75] Inventor: Goichi Kitagawa, Shizuoka, Japan

[73] Assignee: HKS Co., Ltd., Shizuoka, Japan

[21] Appl. No.: 08/961,328

[22] Filed: Oct. 30, 1997

[30] Foreign Application Priority Data

Sep. 19, 1997 [JP] Japan ................................ 9-271913

[51] Int. Cl.$^7$ .................................................. F16H 57/02
[52] U.S. Cl. ........................................ 74/606 R; 184/6.11
[58] Field of Search .......................... 74/606 R; 464/38, 464/16; 184/6.11

[56] References Cited

U.S. PATENT DOCUMENTS 5,558,549  9/1996  Ryoichi et al. .

FOREIGN PATENT DOCUMENTS

| 0526050 | 4/1983 | Japan . |
| 0526050 | 9/1997 | Japan . |
| 1386315 | 3/1975 | United Kingdom . |
| 2018370 | 10/1979 | United Kingdom . |

*Primary Examiner*—David A. Bucci
*Assistant Examiner*—Chong H. Kim
*Attorney, Agent, or Firm*—Dvorak & Orum

[57] ABSTRACT

A power transmission 14 for an engine 10 is structured such that a mounting surface 16A of a gear case (a front cover 16) with respect to a crank case 19, is line symmetrical with respect to a crank shaft 20 and that mounting holes 61A–61H of the gear case (the front cover 16) with respect to the crank case 19 are disposed in a point symmetrical position with respect to the crank shaft 20.

3 Claims, 8 Drawing Sheets

POWER TRANSMISSION FOR AN ENGINE

BACKGROUND OF THE INVENTION

1. Field of the Invention

The present invention relates to a power transmission for an industrial engine, and particularly to a power transmission for an engine which transmits an output of a crank shaft in 4-cycle engine to a power transmitting shaft.

2. Description of the Related Art

Conventionally, a power transmission for a 4-cycle engine in which a crank shaft is supported to a crank case, a power transmitting shaft is supported to a gear case mounted to the crank case, and a pinion gear provided in the crank shaft and a reduction gear provided in the power transmitting shaft are meshed to each other, thereby transmitting a power of the crank shaft to the power transmitting shaft.

In the conventional power transmission for an engine, when the engine is mounted to a vehicle body, a level for taking a power from the power transmission is determined by a distance between the crank shaft of the engine and the power transmitting shaft of the power transmission.

On the other hand, when the engine is mounted to the vehicle body or the like, change of a layout for mounting the power transmission to the engine may be required in order to match the level for taking the power with the vehicle body.

In the conventional power transmission for a 4-cycle engine, a surface (a profile) of the gear case for mounting to the crank case is asymmetric with respect to the crank shaft, so that a mounting direction of the gear case to the crank shaft cannot be changed, and further, the mounting layout of the power transmission to the engine cannot be changed.

SUMMARY OF THE INVENTION

Accordingly, an object of the present invention is to provide a power transmission for an engine in which a mounting direction of a gear case to a crank case can be changed and a mounting layout of the power transmission to the engine can be changed.

In accordance with the present invention, there is provided a power transmission for an engine in which a crank shaft is supported by a crank case of a 4-cycle engine, a power transmitting shaft is supported by a gear case mounted to the crank case and a pinion gear provided in the crank shaft and a reduction gear provided in the power transmitting shaft are meshed to each other, thereby transmitting power of the crank shaft and to the power transmitting shaft, wherein a mounting surface for mounting the gear case to the crank case is disposed in a position which is line symmetrical with respect to the crank shaft and a mounting hole for mounting the gear case to the crank case is disposed in a position which is point symmetrical with respect to the crank shaft.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT (First Embodiment) (FIGS. 1 to 6)

Figure 1:
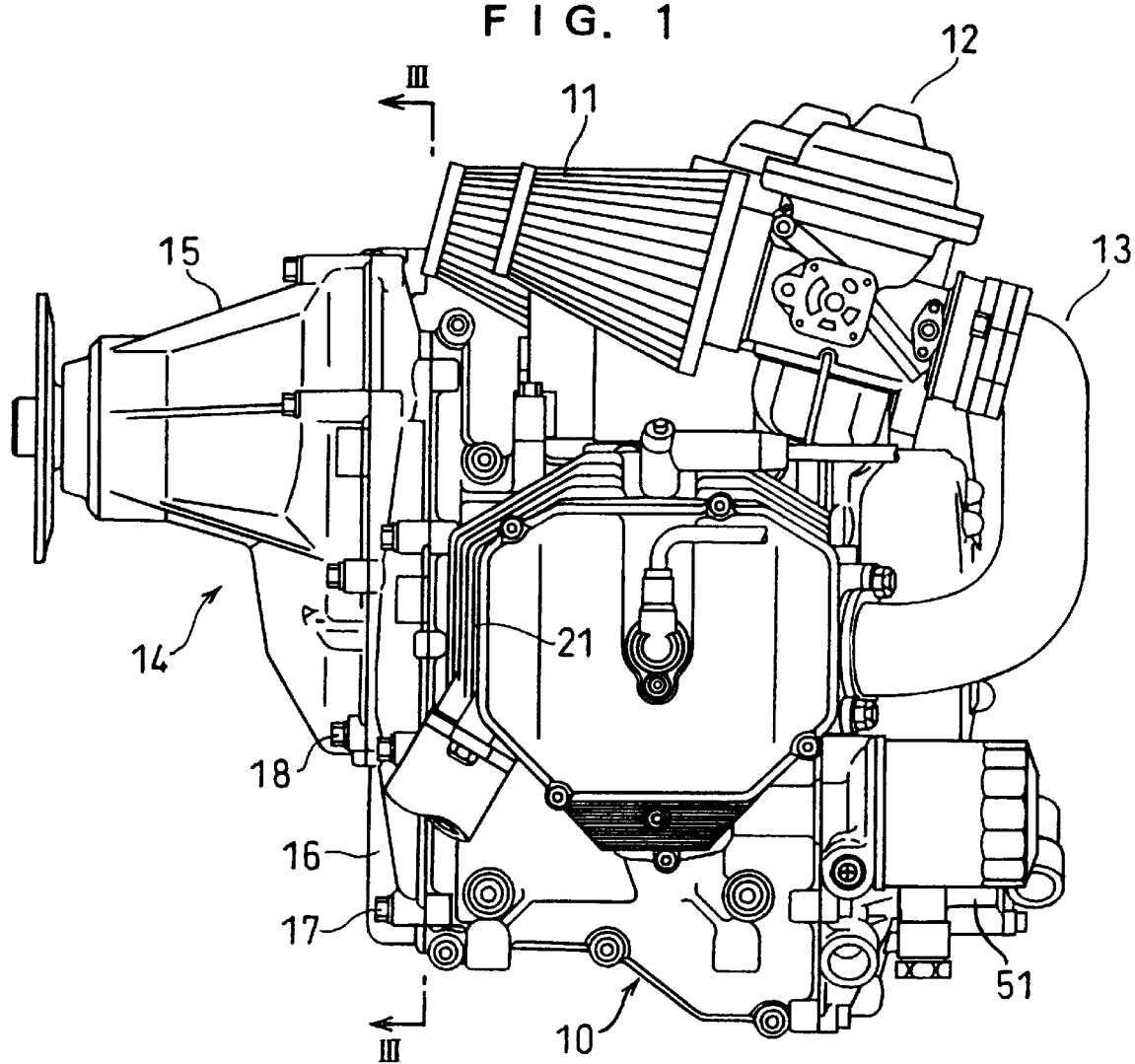
FIG. 1 is a side elevational view showing an engine in accordance with a first embodiment of the present invention in a state in which a gear case is mounted in an upward direction.

An engine 10 shown in FIG. 1 is a horizontal opposed 2-cylinder and 4-cycle engine, in which air sucked through an air cleaner device 11 forms an air-fuel mixture by supplying and vaporizing a fuel in a carburetor 12, and the air-fuel mixture is fed to a combustion chamber (not shown) within the engine 10 through an intake conduit 13.

A power transmission 14 for reducing and outputting engine power is mounted on the engine 10, and a gear housing 15 and a front cover 16 constitute a gear case for housing power transmitting members are connected to the engine 10 through bolts 17 and 18 in serial order.

Figure 2:
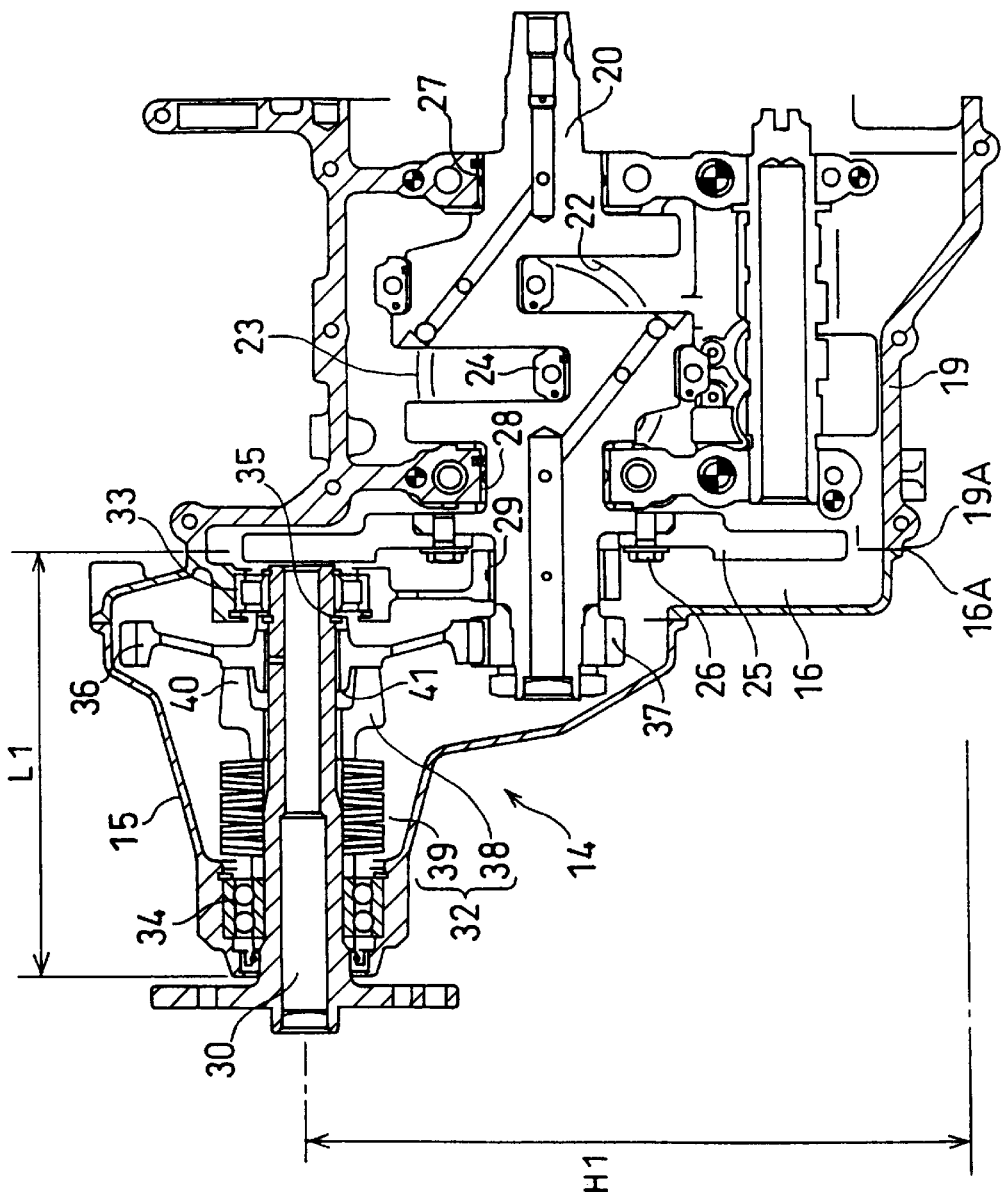
FIG. 2 is a cross sectional view of FIG. 1.

The engine 10 shown in FIG. 2 is a cross sectional view of the engine as shown in FIG. 1, in which a crank shaft 20 is horizontally arranged and supported to a crank case 19. A piston 23 is received in each of two cylinders 22 formed in a cylinder block 21 in a horizontally opposing manner as to reciprocate therewithin. These pistons 23 are connected to the crank shaft 20 by a connecting rod 24. The piston 23 is linearly reciprocated by combustion and expansion of the air-fuel mixture within the combustion chamber (not shown), and the linear reciprocating motion of the piston is converted into a rotational motion of the crank shaft 20 through the connecting rod 24 so that power is outputted from the crank shaft 20.

The above crank shaft 20 extends to the inner portion of the front cover 16 and the gear housing 15 which are connected to the crank case 19 in serial order. A fly wheel 25 is connected to the extended portion by screw 26.

The fly wheel 25 absorbs torque change and engine speed change generated by the engine 10.

Further, the crank shaft 20 is rotatably supported in such a manner as to freely rotate in crank shaft bearing portions 27 and 28 disposed within the crank case 19 and crank shaft bearing portion 29 disposed in the front cover 16. These crank shaft bearing portions 27, 28 and 29 are disposed on both sides of the fly wheel 25.

The power transmission 14 mounted to the engine 10 comprises a power transmitting shaft 30, a reduction gear 36 and an impact absorbing mechanism 32, and reduces and outputs the power generated in the crank shaft 20 of the engine 10.

Normally, the power transmission 30 is disposed above the crank shaft 20 in a parallel manner with respect to the crank shaft 20. The power transmitting shaft 30 is rotatably supported by a power transmitting shaft bearing portion 33 provided in the front cover 16 and a power transmitting shaft bearing portion 34 provided in the gear housing 15. Further, the reduction gear 36 is disposed in the power transmitting shaft 30 through a bearing portion 35 in such a manner as to freely rotate. The reduction gear 36 is always meshed with a pinion gear 37 connected to the above extended portion of the crank shaft 20 and can transmit the power of the crank shaft 20 to the power transmitting shaft 30 end after reducing the number of rotation.

The impact absorbing mechanism 32 has a dog clutch 38 and a plurality of coned disc springs 39. The dog clutch 38 is connected to an outer periphery of the power transmitting shaft 30 by a spline and a pawl 40 of the dog clutch 38 is provided in a pawl 41 of the reduction gear 36 in an engageable manner. Further, the coned disc spring 39 is fitted in the outer periphery of the power transmitting shaft 30 with some degree of play, thereby applying a spring force to the dog clutch 38 so that the pawl 40 of the dog clutch 38 engages with the pawl 41 of the reduction gear 36. In this state, the reduction gear 36 is connected to the power transmitting shaft 30 through the dog clutch 38 in such a manner as to rotate in one united body so that the power produced by the engine 10 is transmitted from the crank shaft 20 of the engine 10 to the power transmitting shaft 30 through the pinion gear 37 and the reduction gear 38 of the power transmission 14.

When the torque change or the rotation change of the power produced on the crank shaft 20 of the engine 10 is large, the impact absorbing mechanism 32 absorbs the impact produced together with the above large torque change or rotation change by relatively slipping the pawl 40 of the dog clutch 38 with respect to the pawl 41 of the reduction gear 36 so that the dog clutch 38 moves to the coned disc spring 39 end against the spring force of the coned disc spring 39, thereby preventing, for example, the reduction gear 36 and the pinion gear 37 from breaking.

In engine 10, lubricating oil from an oil tank (not shown) is fed to respective portions (the bearing portion of the crank shaft 20, the cylinder 22, the sliding portion of the piston 23, the bearing portion of the connecting rod 24 and the like) of the engine 10 and respective portions (the bearing portion of the power transmitting shaft 30, the engaging portion between the pawls 40 and 41 of the dog clutch 38 of the impact absorbing mechanism 32, the engaging portion between the reduction gear 36 and the pinion gear 37 and the like) of the power transmission 14 by an oil supply pump 51 in a pressurized condition. Then, the lubricating oil passed down to the bottom portion of the crank case 19 and the bottom portion of the gear housing 15 and the front cover 16 is returned to the oil tank by an oil return pump (not shown) and is recirculated by the oil supply pump 51 in pressurized condition.

Figure 3:
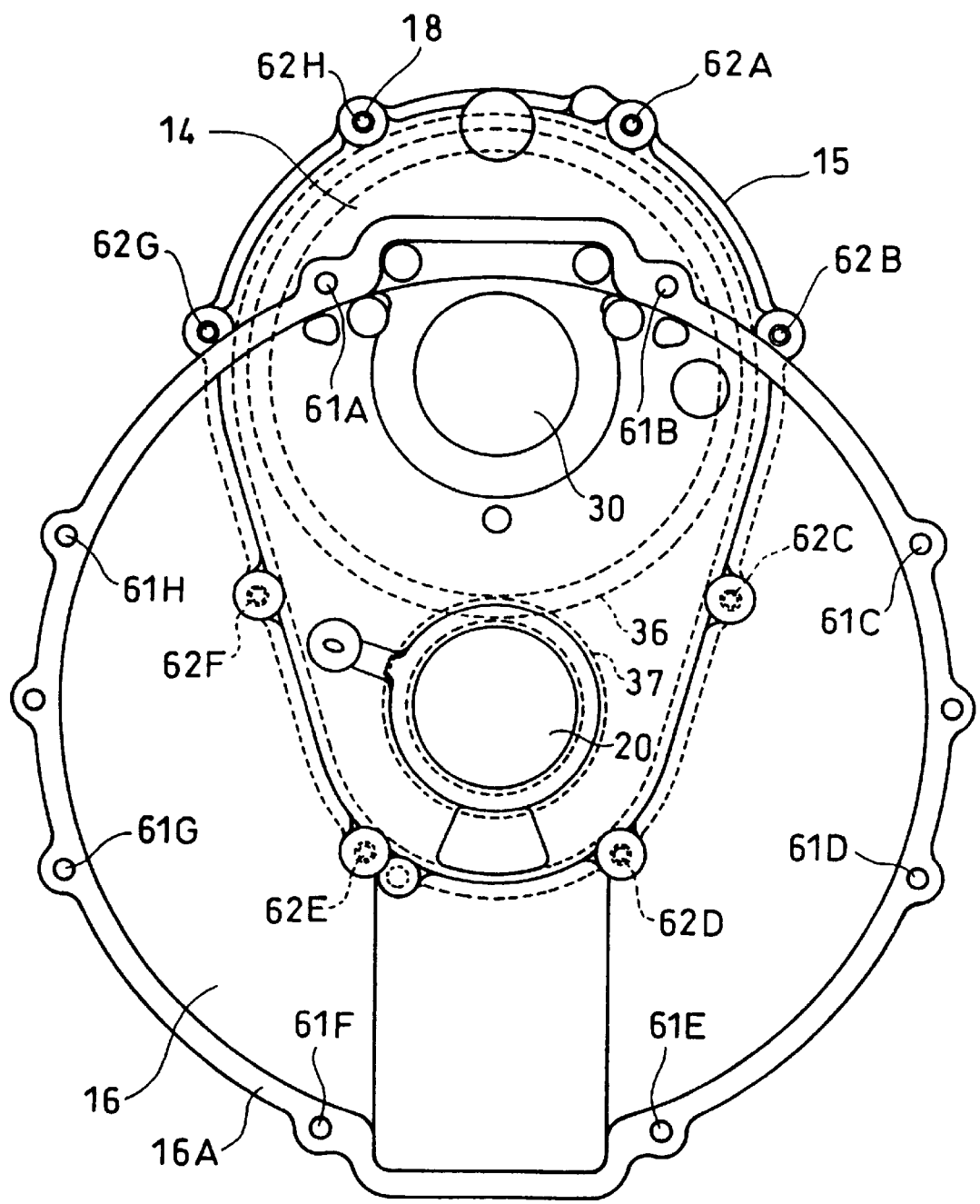
FIG. 3 is a drawing along a line III—III of FIG. 1, typically showing a mounting surface of the gear case to a crank case.

In engine 10, as shown in FIG. 3, the gear housing 15 and the front cover 16 constituting the gear case are mounted so that the front cover 16 is attached to the crank case 19 by mounting holes 61A to 61H and bolts 17, and the gear housing 15 is attached to the front cover 16 by mounting holes 62A to 62H and bolts 18.

In the engine 10, a mounting surface 16A of the front cover 16 for mounting the front cover 16 to a mounting surface 19A of the crank case 19 is formed in a circular shape which is vertically line symmetrical with respect to the crank shaft bearing portion 29 for the crank shaft 20. The mounting holes 61A to 61H of the front cover 16 for mounting the front cover 16 to the crank case 19 are disposed in a position which is point symmetrical with respect to the crank shaft bearing portion 29 of the crank shaft 20.

Figure 4:
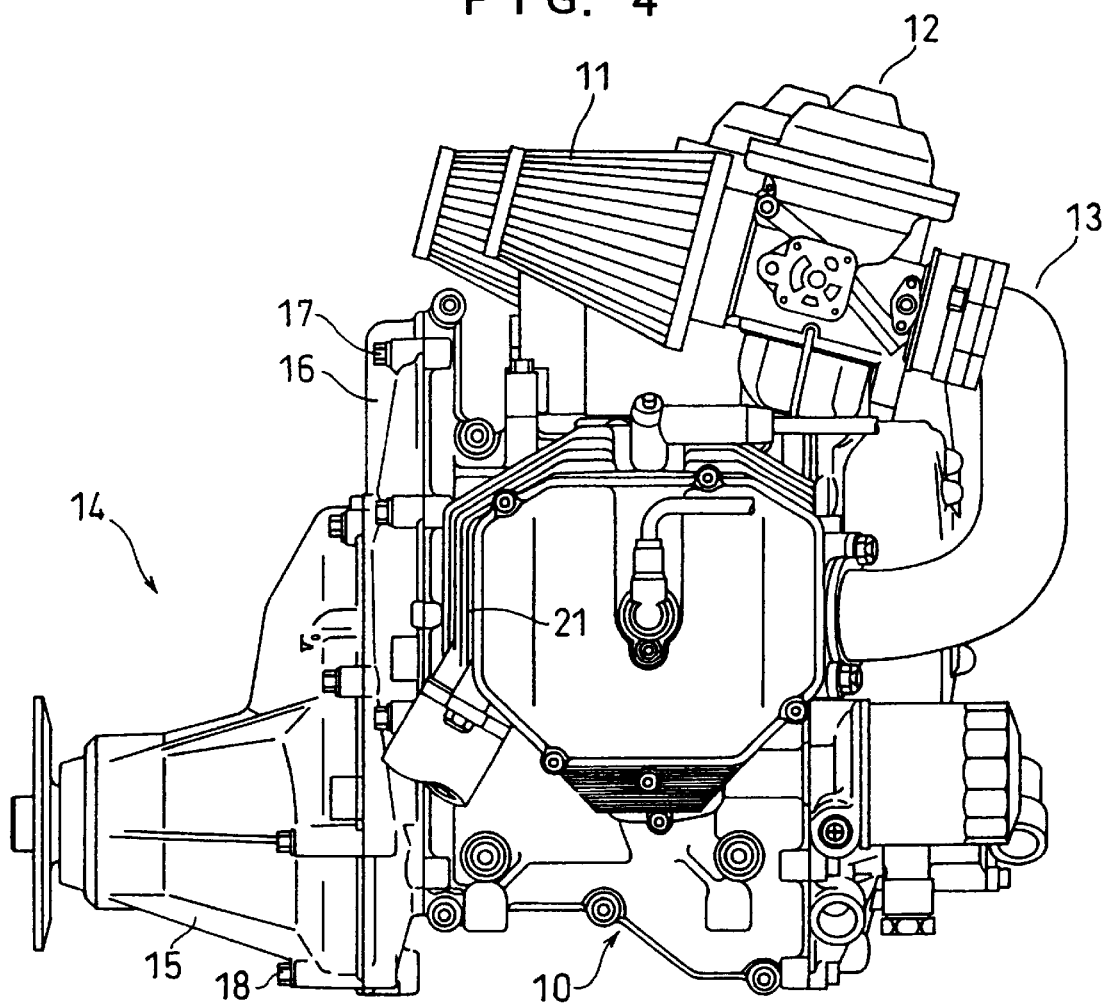
FIG. 4 is a side elevational view showing an engine in which the gear case is mounted in a downward direction.
Figure 5:
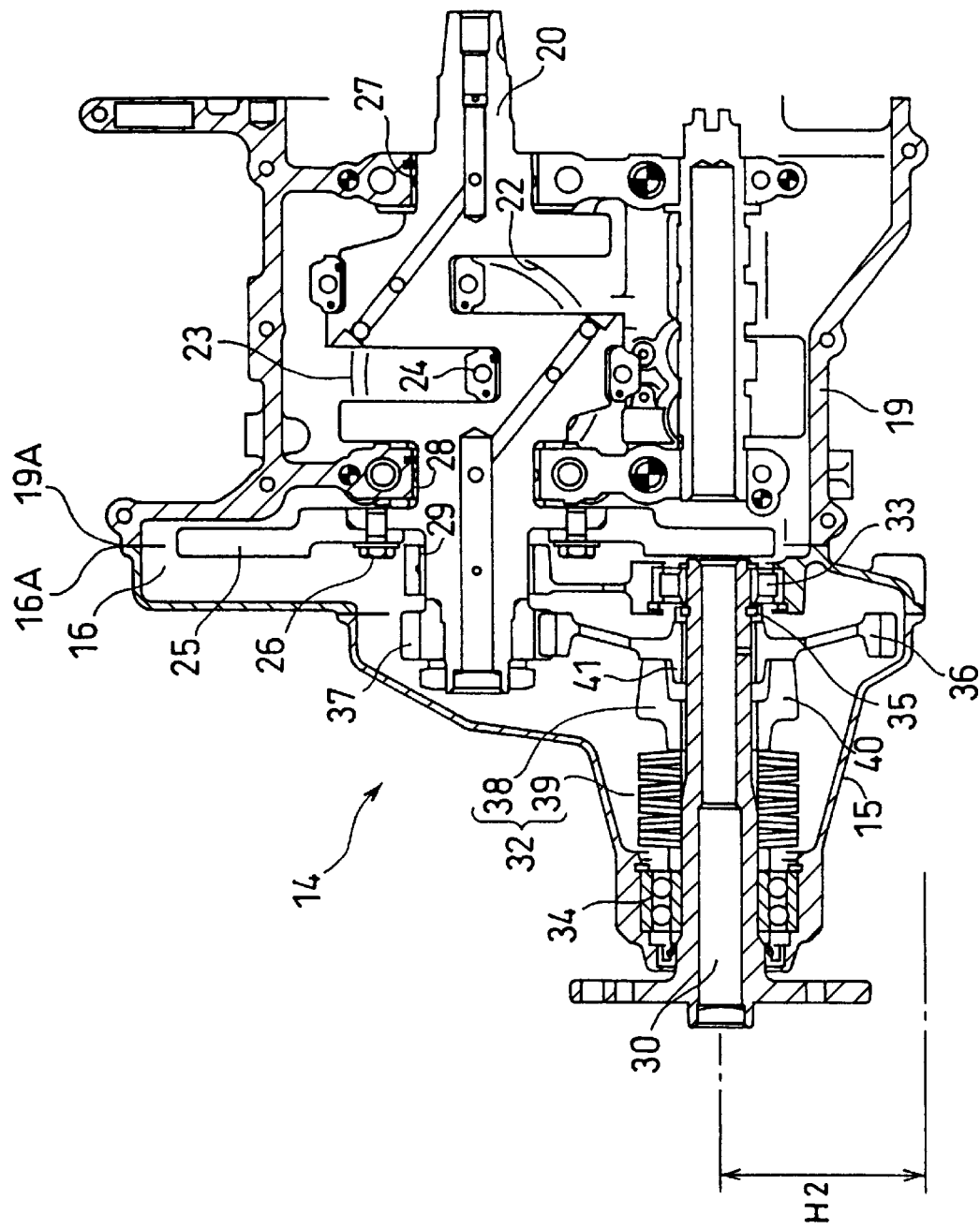
FIG. 5 is a cross sectional view of FIG. 4.

In accordance with the described engine 10, if the front cover 16 constituting the gear case is reversed upside down (reversed at 180 degrees) with respect to the crank case 19, the mounting surface 16A of the front cover 16 can be aligned with the mounting surface 19A of the crank shaft 19 and the mounting holes 61A to 61H of the front cover 16 can be aligned with the mounting holes of the crank case 19 so that the both elements can be fixed. Accordingly, the mounting direction of the front cover 16 with respect to the crank case 19 is changed between the upward direction as shown in FIGS. 1 and 2 and the downward direction as shown in FIGS. 4 and 5, so that the mounting layout of the power transmission 14 with respect to the engine 10 can be changed. Therefore, a level for taking the power with respect to the vehicle body or the like to which the engine 10 is mounted can be set to a high level H1 (FIG. 2) in the case of FIGS. 1 and 2 in which the front cover 16 is mounted in the upward direction or to a low level H2 (FIG. 5) in the case of FIGS. 4 and 5 in which the front cover 16 is mounted in the downward direction.

Further, in the engine 10, the mounting state of the gear housing 15 and the front cover 16 constituting the gear case for the crank case 19 is detachably structured so as to be vertically reversed with respect to the crank case 19 without proving a separation wall between the gear case and the crank case 19. Accordingly, the internal space of the front cover 16 and the internal space of the crank case 19 are connected to each other without passing through a separation wall so that the lubricating oil fed by the oil supply pump 51 in a pressurized condition can be circulated by a single oil supply system passing from the respective elements of the engine 10 to the respective elements of the power transmission 14. In comparison with the apparatus in which an independent oil supply system is provided in each of the engine 10 end and the power transmission 14 end, the oil supply system can be of a simple construction.

Still further, in the engine 10, since a separation wall is not provided between the gear housing 15, the front cover 16 and the crank case 19, as mentioned above, a mounting length L1 (FIG. 2) of the gear housing 15 and the front cover 16 with respect to the crank case 19 can be shortened so that a total length of the engine 10 and the power transmission 14 can be more compact.

As mentioned above, the embodiment of the present invention is described in detail with respect to the drawings, however, the concrete structure of the present invention is not limited to this embodiment, and modifications within the scope of the present invention will be contained in the present invention. For example, in the above embodiment, the explanation is given to the apparatus in which the gear case is separated into two parts consisting of the gear housing 15 and the front cover 16, however, the gear case may be comprised of a single unit in total.

Further, in the present invention, the mounting surface of the gear case to the crank case is not limited to a circular shape but may be a rectangular shape or the like as far as the mounting surface is line symmetrical with respect to the crank shaft.

Figure 6:
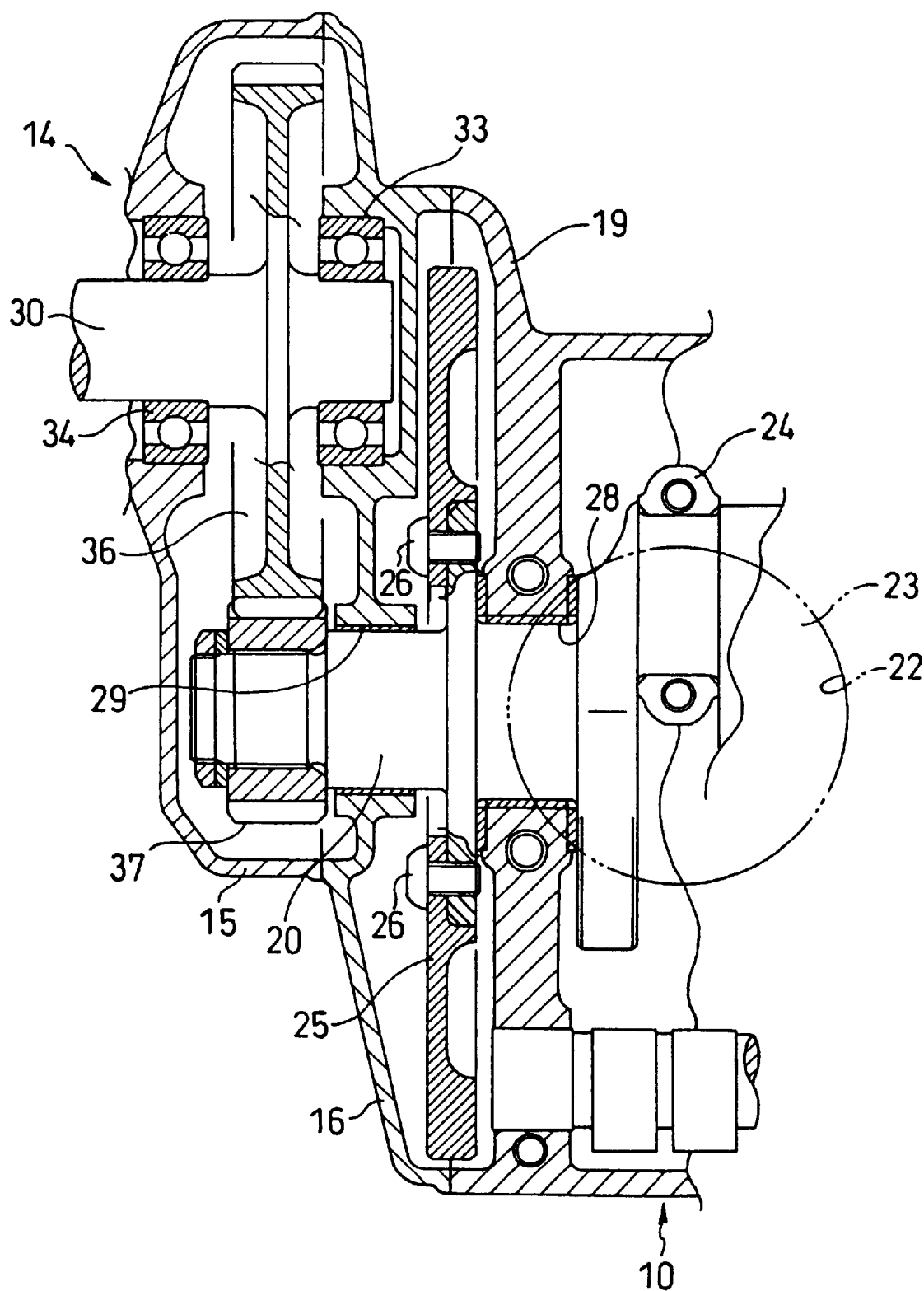
FIG. 6 is a cross sectional view showing a part of FIG. 2 in an enlarged manner.

As shown in FIGS. 2 and 6, the power transmitting shaft 30 is rotatably supported by the power transmitting shaft bearing portion 33 provided in the front cover 16 and the power transmitting shaft bearing portion 34 provided in the gear housing 15. These power transmitting shaft bearing portions 33 and 34 are disposed in one side of the fly wheel 25 connected to the crank shaft 20, and particularly, a front end side of the power transmitting shaft 30 apart from the fly wheel 25.

Since the power transmitting shaft bearing portions 33 and 34 for supporting the power transmitting shaft 30 are supported to one side of the fly wheel 25 provided in the crank shaft 20 of the engine 10, the diameter of the fly wheel 25 can be enlarged without interfering with the power transmitting shaft 30. The fly wheel 25 having an enlarged diameter can sufficiently absorb the torque change and the rotation change of the power produced in the engine 10.

Further, in the case that fly wheel 25 having an enlarged diameter is mounted to the crank shaft 20 of the engine 10, since the power transmitting shaft bearing portions 33 and 34 are disposed in one side of the fly wheel 25, the front cover 16 and the gear housing 15 can be made more compact without necessity of setting a distance between the crank shaft 20 and the power transmitting shaft 30 to a large size, and the power transmission 14 itself can be made more compact.

Figure 7:
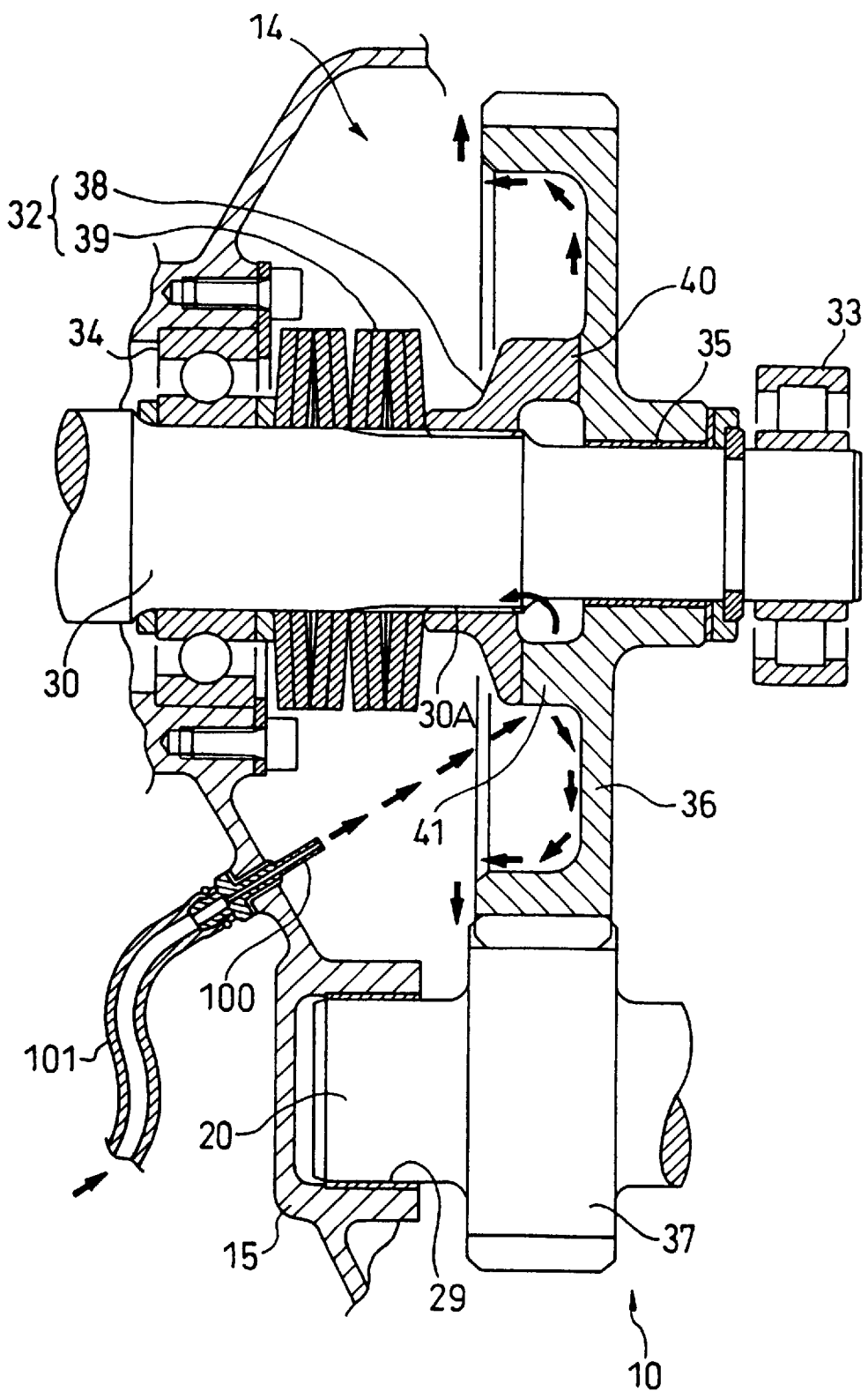
FIG. 7 is a typical drawing showing a second embodiment of the present invention.

(Second Embodiment) (FIG. 7)

A second embodiment of this invention substantially differs from the first embodiment in the following points. As shown in FIG. 7, the gear housing 15 receives the power transmitting shaft 30, the reduction gear 36, the impact absorbing mechanism 32 and the pinion gear 37 constituting the power transmission 14 therewithin. Further, an oil ejection nozzle 100 serving as a lubricating oil ejecting means is provided in the gear housing 15, and the oil ejection nozzle 100 is connected to the oil pump (not shown) through an oil supply line 101. The oil pump supplies a lubricant oil to the rotating parts and the sliding parts of the engine 10 such as the crank shaft bearing portions 27, 28 and 29 and the piston 23, and it injects lubricating oil to the engaging portion between the pawl 40 of the dog clutch 38 and the pawl 41 of the reduction gear 36 in the impact absorbing mechanism 32 through the oil ejection nozzle 100.

The engaging portion between the pawl 40 of the dog clutch 38 and the pawl 41 of the reduction gear 36 is directly lubricated and cooled by the lubricating oil ejected by nozzle 100. The lubricating oil is introduced from a space between the pawls 40 and 41 to the spline 30A of the power transmitting shaft 30 so that the sliding portion of the dog clutch 38 with respect to the power transmitting shaft 30 is lubricated and cooled. Lubricating oil ejected to the pawl 40 of the dog clutch 38 strikes the pawls 40 and 41 and is scattered, thereby performing a mist lubrication of the components of the power transmission 14 within the gear housing 15.

A great amount of lubricating oil is supplied from the oil injection nozzle 100 to the engaging portion between the pawl 40 of the dog clutch 38 and the pawl 41 of the reduction gear 36 in the impact absorbing mechanism 32, in comparison with the case of the mist lubrication. The engaging portion between the pawl 40 of the dog clutch 38 and the pawl 41 of the reduction gear 36 in the impact absorbing mechanism 32 and the sliding portion of the dog clutch 38 with respect to the spline 30A of the power transmitting shaft 30 can be sufficiently lubricated and cooled even in the case of torque change and when rotation change of the power produced in the crank shaft 20 is large and when a large load is applied to the dog clutch 38 and the reduction gear 36 of the impact absorbing mechanism 32. As a result of this, galling phenomenon in the engaging portion between the pawl 40 of the dog clutch 38 and the pawl 41 of the reduction gear 36 and a seizing phenomenon in the sliding portion of the dog clutch 38 with respect to the spline 30A of the power transmitting shaft 30, is suitably controlled.

Figure 8:
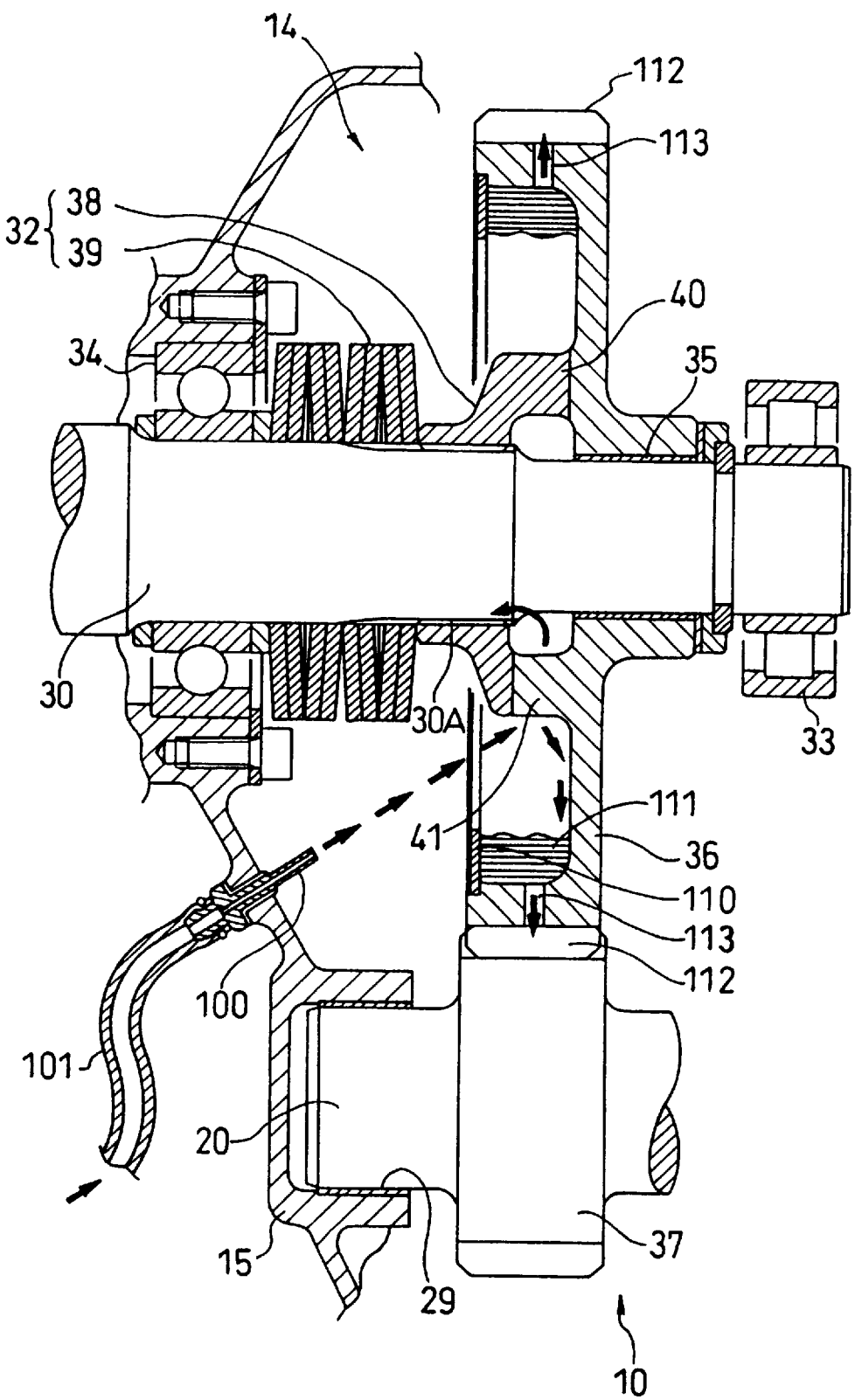
FIG. 8 is a typical drawing showing a third embodiment of the present invention.

(Third Embodiment) (FIG. 8)

A third embodiment of this invention substantially differs from the second embodiment in the following ways. As shown in FIG. 8, in this power transmission 14 of the engine 10, a separation wall 110 is mounted on a side surface of the reduction gear 36 in a peripheral configuration. The separation wall 110 forms an oil reservoir 111 in the inner side of the reduction gear 36. An oil passage 113 for connecting an engaging portion 112 with respect to the pinion gear 37, to the oil reservoir 111 is formed in the reduction gear 36.

Accordingly, lubricating oil ejected from the oil ejection nozzle 100 to the engaging portion between the pawl 40 of the dog clutch 38 and the pawl 41 of the reduction gear 36 in the impact absorbing mechanism 32 and thereafter being scattered, is stored within the oil reservoir 111. It is introduced to the engaging portion 112 with respect to the pinion gear 37 through the oil passage 113 by a centrifugal force created by the reduction gear 36 which rotates at a high speed. Accordingly, even if the torque change and the rotation change of the power produced in the engine 10 is large so that the impact force acts on the engaging portion 112 between the reduction gear 36 and the pinion gear 37 of the crank shaft 20, the engaging portion 112 between the pinion gear 37 and the reduction gear 36 is effectively lubricated and cooled, in comparison with the mist lubrication.

In the above case, the structure in which the separation wall 110 is mounted so as to form the oil reservoir 111 is described for the reduction gear 36. However, an oil reserving portion may be directly formed in the inner portion of the reduction gear 36.

As mentioned above, in accordance with the present invention, in power transmission for an engine, the mounting direction of the gear case with respect to the crank case can be changed and the mounting layout of the power transmission with respect to the engine can be changed.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A power transmission for a 4-cycle engine having a crankcase and a crank shaft supported within said crank case comprising:

a gear case;

a power transmitting shaft supported to said gear case, said gear case mounted to the crank case;

a pinion gear provided on an end of the crank shaft; and a reduction gear provided on the power transmitting shaft, said reduction gear and pinion gear meshed to each other, thereby transmitting a power of the crank shaft to the power transmitting shaft, wherein the gear case includes a mounting surface for mounting the gear case to the crank case, which said mounting surface includes a plurality of mounting holes formed therein, said mounting holes positioned around said gear case such that each of said mounting holes is disposed in a respective position which is point symmetrical with respect to the crank shaft, and wherein the mounting surface is disposed in a position which is line symmetrical with respect to the crank shaft for all pairs of said mounting holes which define a line passing through a center of said crank shaft.

2. The power transmission as recited in claim 1, further including a crank shaft bearing portion and a power transmitting shaft bearing portion, a fly wheel having two sides, said fly wheel provided towards an end of the crank shaft and said crank shaft bearing portion disposed on both sides of said fly wheel for supporting the crank shaft, wherein the power transmitting shaft is disposed in parallel to said crank shaft, and is connected thereto through the reduction gear and a power transmitting shaft bearing portion, for supporting said power transmitting shaft, said bearing portion disposed on only one side of said fly wheel.

3. The power transmission as recited in claim 1, wherein said gear case comprises a gear housing and a front cover mounted to said crank case, said gear case and crank case each including respective internal spaces, which said internal spaces are in communication with each other without first passing through a separation wall between said front cover and crank case.

* * * * *